(12) United States Patent
Takeda

(10) Patent No.: US 6,405,851 B1
(45) Date of Patent: Jun. 18, 2002

(54) CONVEYOR CONTROLLING DEVICE AND CONVEYOR APPARATUS

(75) Inventor: Masato Takeda, Kakogawa (JP)

(73) Assignee: Okura Yusoki Kabushiki Kaisha (JP)

( * ) Notice: Subject to any disclaimer, the term of this patent is extended or adjusted under 35 U.S.C. 154(b) by 1 days.

(21) Appl. No.: 09/631,335

(22) Filed: Aug. 3, 2000

(30) Foreign Application Priority Data

Aug. 19, 1999 (JP) ............................................. 11-233208

(51) Int. Cl.[7] ............................................. B65G 43/10
(52) U.S. Cl. ........................................ 198/575; 198/576
(58) Field of Search .............................. 198/572, 575, 198/576, 781.05, 781.06

(56) References Cited

U.S. PATENT DOCUMENTS

| | | | | |
|---|---|---|---|---|
| 5,058,727 A | * | 10/1991 | Jahns et al. ............. | 198/575 X |
| 5,186,308 A | * | 2/1993 | Munro ..................... | 198/576 X |
| 5,228,558 A | * | 7/1993 | Hall ........................ | 198/576 X |
| 5,285,887 A | * | 2/1994 | Hall ........................ | 198/575 X |
| 5,318,167 A | * | 6/1994 | Bronson et al. .......... | 198/572 X |

* cited by examiner

Primary Examiner—James R. Bidwell
(74) Attorney, Agent, or Firm—Morrison Law Firm

(57) ABSTRACT

A conveyor controlling device which can reduce production costs and can be easily attached. The presence or absence of a load in the conveyor portion in the local zone and a plurality of selected downstream zones is detected. The controlling device stops the drive of the local corresponding zone when a signal indicates the presence of loads in the local zone and in all of the downstream zones. The conveyor controlling device drives the local corresponding zone when the downstream presence signal indicates that at least one downstream zone is vacant. This controlling device provides a simple method for controlling an accumulating conveyor.

13 Claims, 4 Drawing Sheets

CONVEYOR CONTROLLING DEVICE AND CONVEYOR APPARATUS

BACKGROUND OF THE INVENTION

The present invention relates to a conveyor controlling device for controlling driving of local zones that are divided along the transferring direction of a conveyor and can be independently driven, and a conveyor apparatus.

Conventionally, this type of conveyor apparatus is provided with a conveyor having respective zones which are divided along the transferring direction of the conveyor and can be independently driven. A sensor and a solenoid valve for controlling transmission of power of a drive motor are disposed in the respective zones. The sensors and solenoid valves are connected to a central control panel via wires. The control panel controls the solenoid valve on the basis of signals from the sensors.

However, a large number of wires are required between the control panel and the solenoid valves and sensors. The wiring is thus complicated, and increases the difficulty of installing the conveyor apparatus at the installation site.

Therefore, as has been described in, for example, Japanese Laid-Open Patent Publication No. 172549 of 1995, a construction is known, in which a sub-controller internally having a CPU is installed in each respective zone. Each sub-controller includes a sensor and a solenoid valve connected to its respective zone. Each sub-controller is connected to a central controller panel.

However, as has been described in Japanese Laid-Open Patent Publication No. 172549 of 1995, if a central controller panel is provided in addition to a sub-controller, settings should be made both in the central controller panel and sub-controllers. The need for multiple settings increases the difficulty and production cost in using the conveyor.

OBJECTS AND SUMMARY OF THE INVENTION

The present invention was developed in view of the above problems, and it is therefore an object of the invention to provide a conveyor controlling device and a conveyor apparatus, which can be simply installed and can reduce production costs.

A conveyor controlling device according to the invention has respective zones which are divided along the transferring direction of a conveyor and can be independently driven, which is disposed in said respective zones, which comprises local load inputting portions each secured corresponding to a local zone, by which whether or not a load to be transferred exists is inputted in said local zone; a plurality of downstream load inputting portions secured corresponding to selected downstream zones, by which whether or not a load to be transferred exists is inputted in said corresponding zone; and a means for controlling so as to stop the drive of a corresponding local zone when a signal instructing that there is a load to be transferred is inputted from all of said local load inputting portions and downstream load inputting portions, and so as to drive the corresponding local zone when a signal is not inputted, which instructs that there is no load to be transferred, in any of the local load inputting portions and downstream load inputting portions.

The conveyor controller device inputs whether or not a load to be placed in a local zone exists into a local load input portion, inputs whether or not loads to be placed in a plurality of selected downstream zones exist in a plurality of downstream load input portions, stops driving the local corresponding zones when a signal is inputted, from all of the local load input portion and downstream load input portions, that a load exits, and drives the local corresponding zone when no signal is inputted, which instructs that no load exists in either the local load input portion and downstream load input portions, whereby it is possible to control the respective zones of a conveyor with only a simple construction.

A conveyor controlling device according to the invention is featured in that, in addition to the conveyor controlling device as set forth above, the controlling means is provided with an OR circuit which generates an output when an output is issued from the local load inputting portion and any one of the downstream load inputting portions, and an operational amplifier which drives a local zone when an output is issued from said OR circuit.

A conveyor controlling device according to the invention includes, respective zones which are divided along the transferring direction of a conveyor and can be independently driven, comprises local load inputting portions each secured corresponding to a local zone, by which whether or not a load to be transferred exists is inputted in said local zone; a plurality of downstream load inputting portions secured corresponding to selected downstream zones one after another, by which whether or not a load to be transferred exists is inputted in said corresponding zone; a downstream load selecting switch for turning on and off the input of a signal from the downstream load inputting portions; and a means for controlling so as to stop the drive of a corresponding local zone when a signal instructing that there is a load to be transferred is inputted from all of said local load inputting portions and downstream load inputting portions selected by said downstream load selecting switch, and so as to drive the corresponding local zone when a signal is inputted, which instructs that there is no load to be transferred, in any of the local load inputting portions and downstream load inputting portions which are selected by said downstream load selecting switch.

The conveyor controller device inputs whether or not a load to be placed in a local zone exists into a local load input portion, inputs whether or not loads to be placed in a plurality of downstream zones selected by the downstream load selecting switch exist into a plurality of downstream load input portions, stops drive of local corresponding zones when a signal is inputted, from all of the local load input portion and downstream load input portions selected by the downstream load selecting switch, that a load exits, and drives the local corresponding zone when no signal is inputted, which instructs that no load exists in either the local load input portion and downstream load input portions selected by the downstream load selecting switch, whereby it is possible to control the respective zones of a conveyor with only a simple construction.

A conveyor controlling device according to the invention, in addition to the conveyor controlling device as set forth in the first paragraph of this section, the controlling means is provided with an OR circuit which generates an output when an output is issued from the local load inputting portion and any one of the downstream load inputting portions selected by said downstream load selecting switch, and an operational amplifier which drives a local zone when an output is issued from said OR circuit, whereby zones of a conveyor can be controlled by OR circuits and operational amplifiers with a simple construction.

A conveyor controlling device according to the invention, in addition to the conveyor controlling device as set forth in the foregoing paragraphs further comprises a plurality of downstream FULL inputting portions which are provided in downstream zones and input FULL from the corresponding zones; wherein said controlling means outputs a FULL signal when a signal instructing that there is a load is inputted from all of the local load inputting portions and downstream FULL inputting portions, wherein by inputting FULL from zones corresponding to the downstream FULL input portions, a FULL signal is outputted when a signal is inputted, from all of the local load input portions and downstream load input portions, which instructs that a load exists, and FULL can be easily detected.

A conveyor controlling device according to the invention which, in addition to the conveyor controlling device as set forth in any one of the first four paragraphs of this section, further includes a plurality of downstream FULL inputting portions which are secured corresponding to the downstream zones one after another and input, from zones corresponding thereto, that the zones are FULL; and a downstream FULL selecting switch for turning on and off input of a signal from the downstream FULL inputting portions, wherein said controlling means outputs a FULL signal when a signal instructing that there is a load is inputted from all of the local load inputting portions and downstream FULL inputting portions selected by said downstream FULL selecting switch. Therefore, by inputting FULL from the zone corresponding to the downstream FULL input portions selected by the downstream FULL selecting switch, a FULL signal is outputted when a signal instructing that a load exists is inputted from all of the local load input portions and the downstream FULL input portions selected by the downstream FULL selecting switch, whereby FULL can be easily detected.

A conveyor controlling device according to the invention includes, in addition to the conveyor controlling device as set forth in any one of the foregoing paragraphs, further comprises a plurality of downstream FULL CANCEL inputting portions which are secured in downstream zones and input from zones corresponding thereto that the zones are not fill, wherein said controlling means outputs a FULL CANCEL signal when a signal is inputted, which instructs that a load exists in neither of the local load inputting portions or the downstream FULL CANCEL inputting portions. Therefore, by inputting FULL CANCEL from the zones corresponding to the downstream FULL CANCEL input portions, a FULL CANCEL signal is outputted when a signal is inputted, which instructs that no load exists in either of the local load input portion or the downstream FULL input portions. Thus, FULL CANCEL can be easily detected.

A conveyor controlling device according to the invention, in addition to the conveyor controlling device as set forth in any of the first six paragraphs in this section, further comprises a plurality of downstream FULL CANCEL inputting portion which are secured corresponding to the downstream zones one after another and input, from zones corresponding thereto, that the zones are not FULL; and a downstream FULL CANCEL selecting switch for turning on and off an input of a signal from said downstream FULL CANCEL inputting portion; wherein said controlling means outputs a FULL CANCEL signal when a signal is inputted, which instructs that there is no load in either of the local load inputting portions or the downstream FULL CANCEL inputting portion selected by the downstream FULL CANCEL selecting switch. Therefore, by inputting FULL CANCEL from a zone corresponding to the downstream FULL CANCEL input portion selected by the downstream FULL CANCEL selecting switch, a FULL CANCEL signal is outputted when a signal is inputted, which instructs that no load exists in the local load input portion and the downstream FULL CANCEL input portion selected by the downstream FULL CANCEL selecting switch, whereby the FULL CANCEL can be easily detected.

A conveyor controlling device according to the invention, in addition to the conveyor controlling device as set forth in any one of the foregoing paragraphs, it further comprises a drive input portion which inputs a signal forcedly driving a local zone, wherein said controlling means forcedly drives the local zone when a signal is inputted in said drive input portion, whereby forced removal of the load is enabled by inputting a signal into the drive input portion.

A conveyor controlling device according to the preceding paragraph which, in addition to the conveyor controlling device as set forth in the preceding paragraph and any one of the first eight paragraphs of this section, further comprises a drive input portion which inputs a signal forcedly driving a local zone, and a drive selecting switch for turning on or off an input of a signal from said drive input portion; wherein said controlling means forcedly drives the local zone when a signal is inputted in said drive input portion in a state where the drive selecting switch is turned on, whereby if a signal is inputted into the drive input portion in a state where a signal from the drive input portion is inputted by the drive selecting switch, the local zone can be forcedly driven, and forced removal of a load is enabled by inputting a signal into the drive input portion.

A conveyor apparatus according to the foregoing paragraph further including a plurality of zones along the transferring direction of the conveyor, which are divided into a plurality along the transferring direction and can be independently driven; and conveyor controlling devices described in any one of the foregoing paragraphs of this section, which are disposed corresponding to these zones, whereby respective actions can be brought about.

The above, and other objects, features and advantages of the present invention will become apparent from the following description read in conjunction with the accompanying drawings, in which like reference numerals designate the same elements.

DETAILED DESCRIPTION OF THE INVENTION

Hereinafter, a description is given of an accumulation conveyor which is one of the embodiments of a conveyor apparatus according to the invention, with reference to the accompanying drawings.

Figure 1:
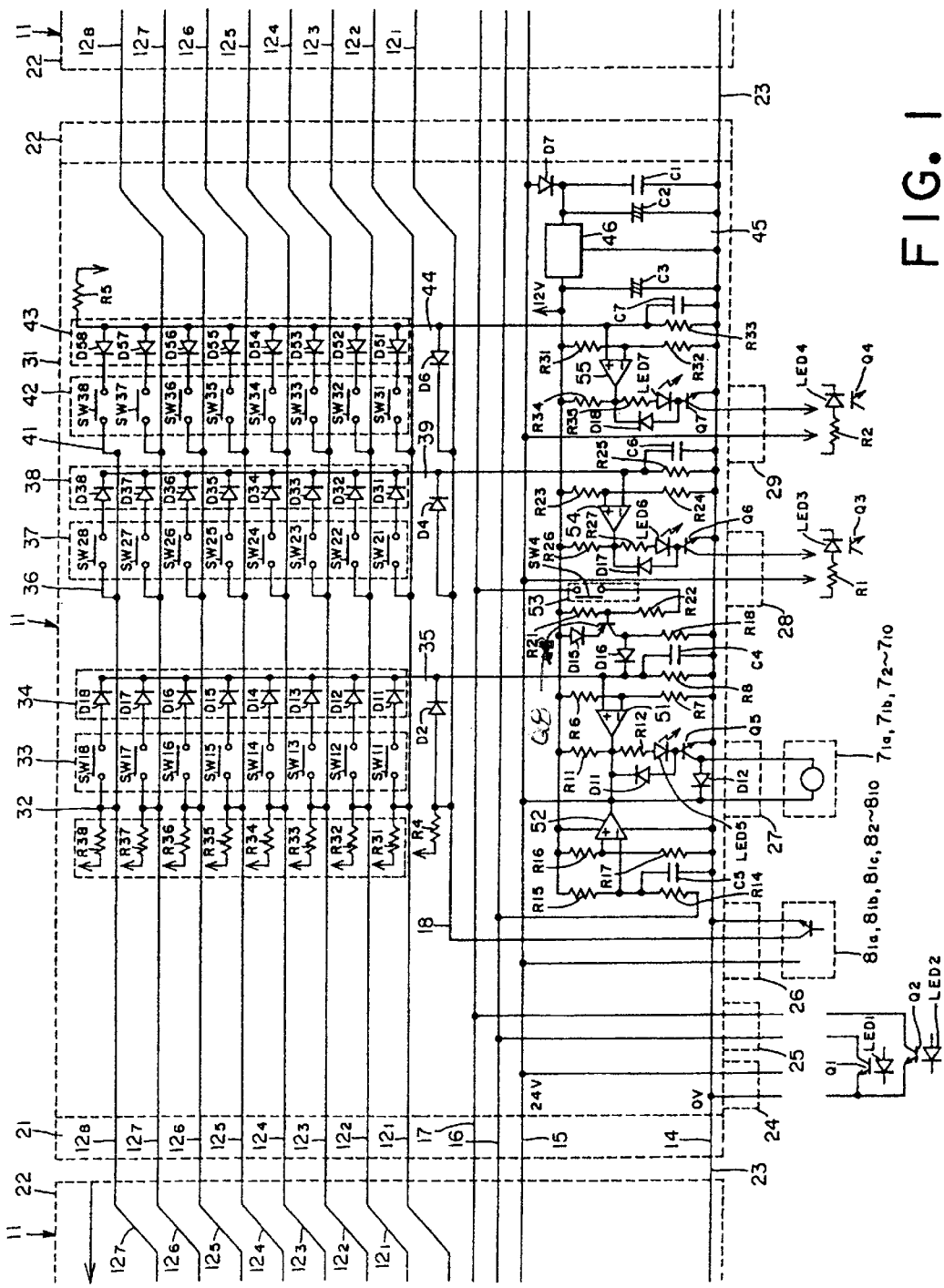
FIG. 1 is a circuit diagram showing one embodiment of a conveyor controlling device according to the invention.

As shown in FIG. 1, an accumulation conveyor, shown generally at 1, is divided into, for example, eleven zones, that is, divided into eleven zones of conveyor portions $2_{1a}$, $2_{1b}$, $2_2$ through $2_{11}$. Also, the accumulation conveyor is not limited to that in which a single conveyor is divided into a plurality of zones, but may be applicable to that in which the entire conveyor is used as a single zone.

Figure 4:
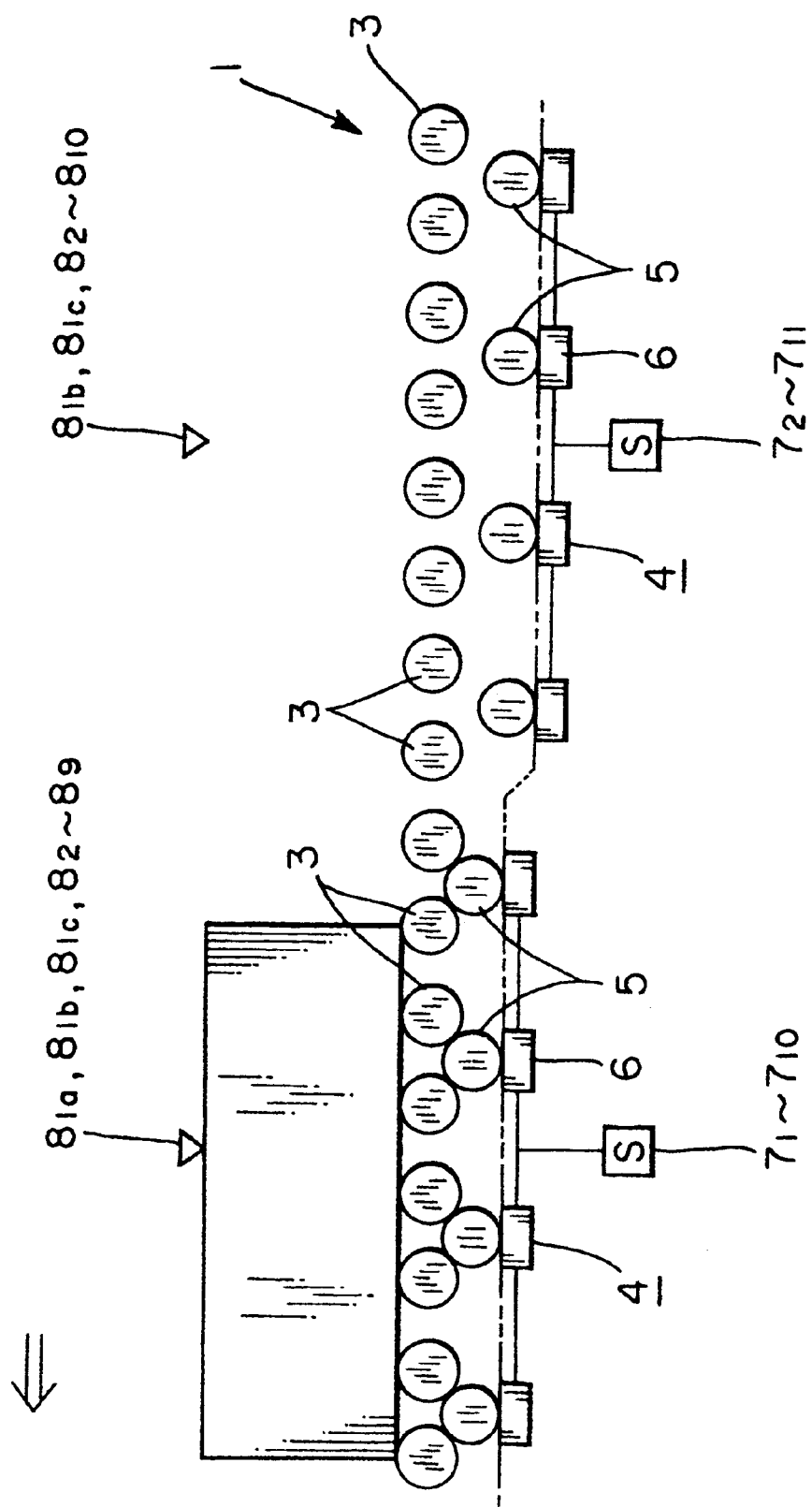
FIG. 4 is a side elevational view showing the actions of the same conveyor apparatus.

Further, the accumulation conveyor 1 has a plurality of rotatable transfer rollers 3 each having a rotating shaft in a direction orthogonal to the transferring direction of a load O to be transferred. Also, an elevatable drive portion 4 is formed at each of the zones of the transfer rollers 3. The drive portion 4 can be engaged with or disengaged from the transfer rollers 3, wherein the drive portion 4 is provided with drive rollers 5 which rotate the transfer rollers 3 by the drive portion 4 being engaged with the transfer roller 3. The drive rollers 5 can be elevated by an elevating device 6, which is elevated by solenoid valves $7_{1a}$, $7_{1b}$, $7_2$ through $7_{11}$. The transfer rollers 3 are driven and rotated by the drive motor 5 when the elevating device 6 is elevated, as shown to the left in FIG. 4. The drive rotor 5 is separated from the transfer rollers 3 when the elevating device 6 is lowered, as shown to the right of FIG. 4. In the lowered condition of elevating device 6, the transfer rollers 3 are not rotated.

Photoelectric sensors $8_{1a}$ and $8_{1b}$ in the conveyor portion $2_{1a}$ detect the presence of a load O at two points, one at the upstream side and the other at the downstream side. In the conveyor portions $2_{1b}$, $2_2$ through $2_{11}$, photoelectric sensors $8_{1c}$, $8_2$ through $8_{11}$ are disposed only at the downstream sides.

A substrate 11 acts as a conveyor controlling device located, respectively, in the conveyor portions $2_{1a}$, $2_{1b}$, $2_2$ through $2_{11}$ which constitute the respective zones.

As shown in FIG. 1, each substrate 11 includes eight signal lines $12_1$ through $12_8$. The eight signal lines each carry respective signals from like-numbered zones in other substrates 11. Seven lines of these signal input lines $12_2$ through $12_8$ are, respectively, connected to signal input lines $12_1$ through $12_7$ of the downstream zones. Seven signal input lines $12_1$ through $12_7$ are, respectively, connected to signal input lines $12_2$ through $12_8$ of the substrates 11 of the upstream zones. DC power source lines 14, 15, running signal line 16, drivable setting line 17, and local signal line 18 are disposed in each substrate 11, and connected to corresponding lines in upstream and downstream neighbors. The signal input lines $12_1$ through $12_8$, power source lines 14, 15, running signal line 16 and drivable setting line 17 are connected to the connectors 21 and 22 at the upstream and downstream sides of the substrate 11. A flat cable is used to connect connectors 21 and 22 to each other.

The power source lines 14 and 15 are connected to a power source input portion 2. The running signal line 16 and drivable setting line 17 are connected to a drive input portion 25. A photo transistor Q1 for running input signals and a light emitting diode LED1 photo-coupled to the photo transistor Q1 are connected between the drivable setting line 17 and the power source line 14. A photo transistor Q2 for running input signals and a light emitting diode LED2 photo-coupled to the photo transistor Q2 are connected between the drivable setting line 17 and the power source line 14. The power source lines 14, 15 and the running signal line 16 are connected to a local load input portion 26. Photosensors $8_{1c}$, and $8_2$ through $8_{11}$ are connected to the local load input portion 26.

A drive output portion 27 is connected to solenoid valves $7_{1a}$, $7_{1b}$ and $7_2$ through $7_{11}$ are connected to the drive output portion 27.

The conveyor controlling portion (substrate) 11 is provided with a FULL output portion 28 and a FULL CANCEL output portion 29. A series circuit of a resistor R1, a light emitting diode LED3 and a photo transistor Q3 photo-coupled to the light emitting diode LED3 are connected to the FULL output portion 28. A series circuit of a resistor R2, a light emitting diode LED4, and a photo transistor Q4 photo-coupled to the light emitting diode LED4 are connected to the FULL CANCEL output portion 29.

Next, a description is given of a controlling means 31 of the substrate 11.

A downstream load input portion 32 at the signal input lines $12_1$ through $12_8$ has pull-up resistors R31 through R38 connected thereto, corresponding to the signal input lines $12_1$ through $12_8$. Dip switches SW11 through SW18 form a downstream load selecting switch 33. The settings of dip switches SW11 through SW18 determine whether or not the signal on its respective line is inputted. Diodes D11 through D18 constituting an OR circuit 34 are connected to the signal input lines $12_1$ through $12_8$ in series. In addition, a pull-up resistor R4 and a diode D2 are connected to the local signal line 18. The diode D2 forms an OR circuit 35 along with the OR circuit 34.

A downstream FULL input portion 36 is formed at the signal input lines $12_1$ through $12_8$, wherein, corresponding to the signal input lines $12_1$ through $12_8$, switches SW21 through SW28 each formed of a dip switch as a downward FULL selecting switch 37 for setting whether or not the signal is inputted, and diodes D31 through D38 constituting an OR circuit 38 are connected to the downstream FULL input portion 36 in series. A diode D4 is connected to the local signal line 18, and the diode D4 forms an OR circuit 39 along with the OR circuit 38.

A downstream FULL CANCEL input portion 41 is formed at the signal input lines $12_1$ through $12_8$. Corresponding to the signal input lines $12_1$ through $12_8$, dip switches 31 through 38 serve as a downstream FULL CANCEL selecting switch 42 to set whether or not their respective signals are inputted. Diodes D51 through D58 constituting an OR circuit 43 are connected in series to the downstream FULL CANCEL input portion 41. A diode D6 is also connected to the local signal line 18. A diode D6 forms an OR circuit 44 with the OR circuit 43.

A power source 43 for the output of 12V is formed between the power source lines 14 and 15. In the power source 45, a series circuit of a diode D7 and a capacitor C1 is connected between the power source line 15 and power source line 14. A capacitor C2 and a 3-terminal regulator 46 are connected to the capacitor C1 in parallel. A capacitor C3 is connected to the 3-terminal regulator 45.

A resistor R6 and a resistor R7 are connected in series, in the power source 45. A reversal input terminal of an operational amplifier 51, which functions as a comparator, is connected to the junction of the resistors R6 and R7. A non-reversal input terminal of the operational amplifier 51 is connected to the OR circuit 35. The non-reversal input terminal of the operational amplifier 51 is also connected to the power source line 14 via a parallel circuit of a resistor R8 and a capacitor C4. The output terminal of the operational amplifier 51 is connected to the 3-terminal regulator 46 via a resistor R11. A diode D11 is connected, in parallel, to the series circuit of a resistor R12 and a light emitting diode LED5 and is connected to the base of a transistor Q5. The emitter of the transistor Q5 is connected in the power source line 14. The collector of transistor Q5 is connected to the output terminal of the operational amplifier 51. A diode D12 is connected to the drive output portion 27 and is further connected to the solenoid valves $7_{1a}$, $7_{1b}$, and $7_2$ through $7_{11}$.

Also, the diode D12 is connected from the running signal line 16 to the 3-terminal regulator 46 via resistors R14 and R15. The point of connection of the resistors R14 and R15 is connected to the non-reversal input terminal of the operational amplifier 52 which functions as a comparator. A series circuit of the resistors R16 and R17 is connected in the power source 45. The junction of the resistors R16 and R17 is connected to a non-reversal input terminal of the operational amplifier 52.

A diode D15, emitter of the transistor Q8, and a series circuit of the collector of the transistor Q8 and resistor RI 8 are connected in the power source 45. The collector of the transistor Q8 is connected to the non-reversal input terminal of an operational amplifier 51 via a diode D16. The base of the transistor Q8 is connected to the 3-terminal regulator 46 via a resistor R21. The base of the transistor Q8 is also connected to a drivable setting line 17 via a setting switch SW4. Setting switch SW4 is part of a setting switch 53 formed of a resistor R22 and a dip switch. Setting switch 53 determines whether or not a drivable signal is inputted.

Also, a series circuit of resistors R23 and R24 is connected in the power source 45. The non-reversal input terminal of the operation amplifier 54 which functions as a comparator is connected to the junction of the resistors R23 and R24. The reversal input terminal of the operational amplifier 54 is connected to the OR circuit 39, and to the power source line 14 via a parallel circuit of the resistor R25 and capacitor C6. The output terminal of the operational amplifier 54 is connected to the 3-terminal regulator 46 via a resistor R26. The series circuit of the resistor R27 and light emitting diode LED6, and the diode D12 are inversely connected in parallel to each other and are connected to the base of the transistor Q6. The emitter of the transistor Q6 is connected to the power source line 14. The collector of the transistor Q6 is connected to the output terminal of the operational amplifier 53 via a diode D17. The transistor Q6 is connected to the FULL output portion 28 and to the light emitting diode LED3.

A series circuit of resistors R31 and R32 is connected in the power source 45. A reversal input terminal of an operational amplifier 55 which functions as a comparator is connected to junction of the resistors R31 and R32. The non-reversal input terminal of the operational amplifier 55 is connected to another OR circuit 44. The non-reversal input terminal of the operational amplifier 55 is also connected to the power source line 14 via a parallel circuit of the resistor R33 and capacitor C7. The output terminal of the operational amplifier 55 is connected to the 3-terminal regulator 46 via a resistor R34. A series circuit of the resistor R35, a light emitting diode LED7, and diode D18 are inversely connected in parallel to each other and are connected to the base of the transistor Q7. The emitter of the transistor Q7 is connected to the power source line 14, and its collector is connected to the output terminal of the operational amplifier 55 via a diode D18. The transistor Q7 is connected to the FULL CANCEL output portion 29 and is connected to the light emitting diode LED4.

Figure 2:
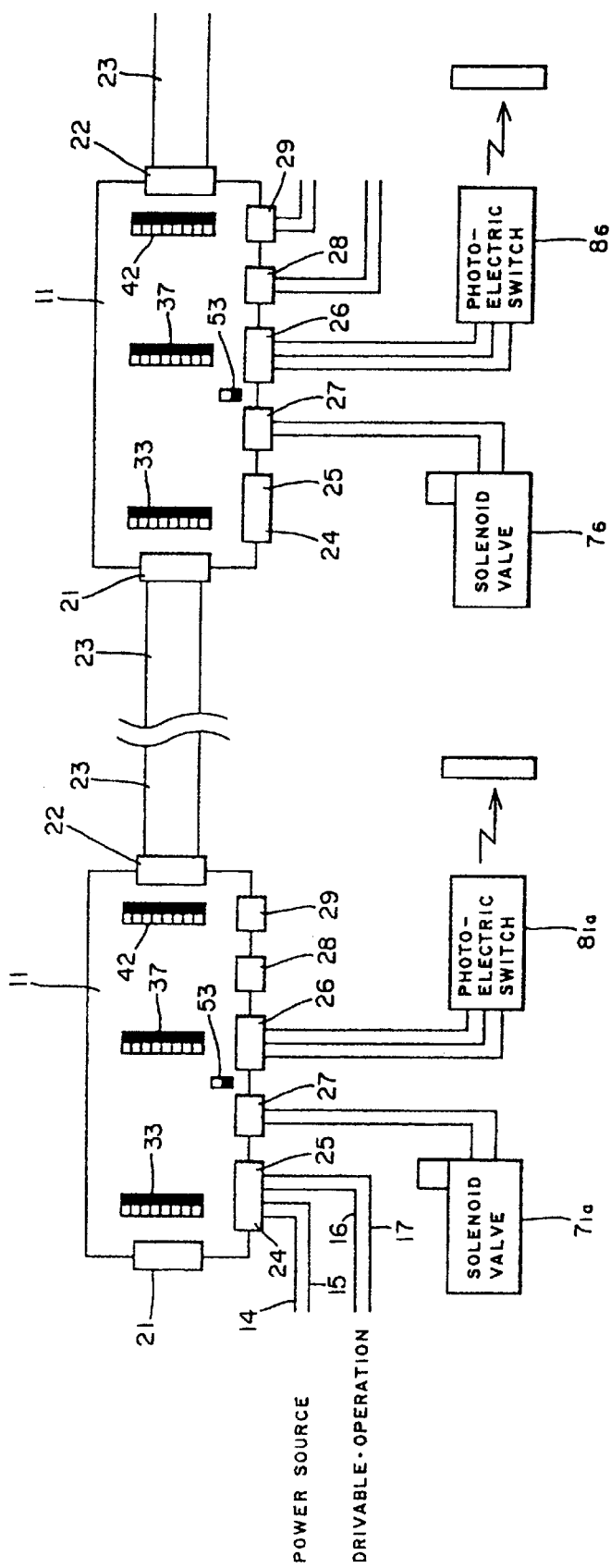
FIG. 2 is an explanatory view showing a connected state in FIG. 1.
Figure 3:
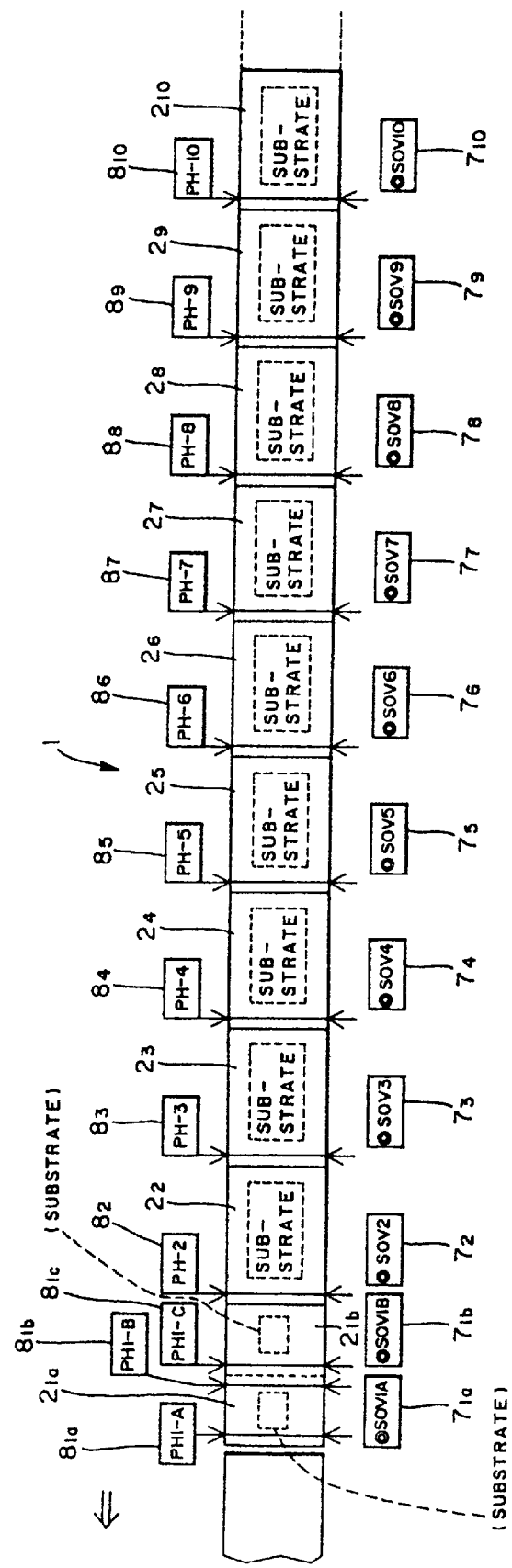
FIG. 3 is an explanatory view showing a conveyor apparatus in FIG. 1.

The respective substrates 11 are continuously connected to each other by a flat cable 23 as shown in FIG. 2. Solenoid valves $7_{1a}$, $7_{1b}$, and $7_2$ through $7_{11}$ are connected to the drive output portion 27 of the respective substrates 11. Photoelectric sensors $8_{1c}$, and $8_2$ through $8_{11}$ are connected to the local load input portions 26. A power source of 24V DC is connected to the power input portion 24 of any one of the substrates 11, wherein a circuit for setting DRIVE or forced operation is connected to the drive input portion 25.

As described above, a circuit indicating FULL or FULL CANCEL is connected to the FULL output portion 28 and FULL CANCEL output portion 29 of any one of the substrates 11.

In addition, switches SW11 through SW18 acting as downstream load selecting switches 33, switches SW21 through SW28 acting as downstream FULL selecting switches 37, and switches SW31 through SW38 acting as downstream FULL CANCEL selecting switches are used to set how many downstream zones are detected in the conveyor portions $2_{1a}$, $2_{1b}$, $2_2$ through $2_{11}$. Since conveyor portions $2_{1a}$, $2_{1b}$, $2_2$ through $2_{11}$ in one zone are made empty without fail if detection is carried out in the conveyor portions in only one downstream zone, a plurality of conveyor portions $2_{1a}$, $2_{1b}$, $2_2$ through $2_{11}$ in the downstream zones must be set for detection. The number of detectable conveyor portions $2_{1a}$, $2_{1b}$, $2_2$ through $2_{11}$ in the downstream zones is eight.

Next, a description is given of actions of the abovementioned embodiment. Either of the downstream load selecting switch 33, downstream FULL selecting switch 37 or downstream FULL CANCEL selecting switch 42 is set so that the conveyor portions $2_{1a}$, $2_{1b}$, $2_2$ through $2_{11}$ in eight downstream zones can be detected.

First, the light emitting diode LED1 is lit so that operation is enabled

When operating the conveyor portions $2_{1a}$, $2_{1b}$, $2_2$ through $2_{11}$ in a state where no load O exists, since none of the photoelectric sensors $8_{1a}$, $8_{1b}$, and $8_2$ through $8_{11}$ of any selected zone or the local zone detect any load O, no signal flows in the signal input lines $12_1$ through $12_7$, wherein an OFF state is kept from the downstream load input portion 32 and local load input portion 26, and as the capacitor C4 is charged by output from the OR circuit 35, the operational amplifier 51 outputs at HIGH level, and a base current is supplied to the base of the transistor Q5 to cause the transistor Q5 to be turned on. Therefore, the solenoid valves, $7_{1a}$, $7_{1b}$, and $7_2$ through $7_{11}$ are turned on. This raises the drive roller 5 into contact with the transfer roller 3 to cause transfer roller 3 to rotate. This places the load O in a transferable state.

In addition, in this state, a signal flows in the signal input lines $12_1$ through $12_7$, the signal is inputted by either of the downstream FULL input portion 36 or the local load input portion 26. As the OR circuit 39 output charges the capacitor C6, the operational amplifier 55 outputs a LOW level output. This supplies a base current to the base of the transistor Q7. As a result, the transistor Q7 remains in an OFF state. Therefore, since neither of the conveyor portions $2_{1a}$, $2_{1b}$, $2_2$ through $2_{11}$ of either of the selected zone and local zone is FULL with the load O, no FULL signal is outputted.

In this state, a signal flows in the signal input lines $12_1$ through $12_7$. No signal is inputted from either of the downstream FULL CANCEL input portion 36 or the local load input portion 26. Since the OR circuit 44 does not produce an output, the capacitor C7 is charged via a resistor R5. When the voltage on capacitor C7 rises to a level exceeding the reference voltage at the junction of resistors R31 and R32, the operational amplifier 55 enters a HIGH level. A base current is supplied to the base of the transistor Q7. Then, since the transistor Q7 is turned on and no load O exists in the conveyor portions $2_{1a}$, $2_{1b}$, $2_2$ through $2_{11}$ in either of a selected zone or local zone, a FULL CANCEL signal is generated.

Even though this state is continued and a load O is positioned in a part of the downstream side conveyor portions $2_{1a}$, $2_{1b}$, $2_2$ through $2_{11}$, the OR circuit 35 produces an output. Therefore, since the transistor Q5 remains in an ON state, the solenoid valves $7_{1a}$, $7_{1b}$, and $7_2$ through $7_{11}$ also maintain an ON state. The drive roller 5 is brought into contact with the transfer rollers 3 to rotate the transfer rollers 3, whereby the load O is maintained in a transferrable state.

Also, since the OR circuit 44 produces an output, the operation amplifier 55 maintains a LOW level output, and the transistor Q7 remains in an OFF state. Therefore, since any of the conveyor portions $2_{1a}$, $2_{1b}$, $2_2$ through $2_{11}$ of a selected zone and a local zone is not FULL with the load O, no FULL is indicated.

Since a signal flows in only some of the signal input lines $12_1$ through $12_7$, a signal is inputted from the downstream FULL CANCEL input portion 41 and local load input portion 26, wherein the OR circuit 44 produces an output to cause the operational amplifier 55 to enter a LOW level. Therefore, since no base current is supplied to the base of the transistor Q7, and the transistor Q7 is turned off, a load O will exist in either of the conveyor portions $2_{1a}$, $2_{1b}$, $2_2$ through 211 of a selected zone and a local zone, whereby FULL CANCEL is not indicated.

When a load in either of the selected conveyor portions $2_{1a}$, $2_{1b}$, $2_2$ through $2_{11}$ which will be an object is transferred, all the photo-electric sensors $8_{1a}$, $8_{1b}$, and $8_2$ through $8_{11}$ of the selected zones and local zone detect the load O. Therefore, the signal flows in all the signal lines $12_1$ through $12_7$, either of the downstream load input portions 32 or the local load input portion 26 is turned on, and no signal is outputted from the OR circuit 35. Then, the operation amplifier 51 outputs a LOW level signal, and no base current is supplied to the base of the transistor Q5. The transistor Q5 thus enters an OFF state. Accordingly, the solenoid valves $7_{1a}$, $7_{1b}$, and $7_2$ through $7_{11}$ enter an OFF state,.wherein the drive roller 5 remains out of contact with the transfer rollers 3, whereby the transfer rollers 3 do not rotate to move the load O. Thereby, the load O is prevented from being brought into collision with the preceding load O located in its downstream side.

Also, in this state, no signal flows into the signal input lines $12_1$ through $12_7$, and no signal is inputted from either of the downstream FULL input portion 36 or the local load input portion 26. Since no signal is outputted from the OR circuit 39, the operation amplifier 55 outputs a HIGH level signal, and base current is supplied to the base of the transistor Q7. Since the transistor Q7 is turned on, and the conveyor portions $2_{1a}$, $2_{1b}$, $2_2$ through $2_{11}$ of the selected zone and the local zone are FULL with loads O, the FULL signal is generated.

Further, in this state, no signal flows in the signal input lines $12_1$ through $12_7$, and a signal is inputted from all of the downstream FULL CANCEL input portions 41 and local load input portion 26, wherein the OR circuit 44 outputs a signal, and the operational amplifier 55 outputs a LOW level signal, and no base current is supplied into the base of the transistor Q7. Since the transistor Q7 is turned off and loads O exists in all the conveyor portions $2_{1a}$, $2_{1b}$, $2_2$ through $2_{11}$ of the selected zones and local zone, no FULL CANCEL signal is generated.

As a load O is removed from any one of the selected downstream conveyor portions $2_{1a}$, $2_{1b}$, $2_2$ through $2_{11}$, a signal is outputted from the OR circuit 35 to cause the transistor Q5 to be turned on, and the solenoid valves $7_{1a}$, $7_{1b}$, and $7_2$ through $7_{11}$ are accordingly turned on, wherein the drive roller 5 is brought into contact with the transfer rollers 3 to rotate the transfer rollers 3, whereby the loads O is transferrable. Thus, the conveyor controlling device detects whether or not a load O exists in eight downstream conveyor portions $2_{1a}$, $2_{1b}$, $2_2$ through $2_{11}$ at maximum. If the device detects that no load is left in any of these conveyor portions $2_{1a}$, $2_{1b}$, $2_2$ through $2_{11}$, a transfer action can be efficiently carried out by actuating the local conveyor portions $2_{1a}$, $2_{1b}$, $2_2$ through $2_{11}$.

Since the OR circuit 44 outputs a signal, the operational amplifier 55 maintains LOW level output, and the transistor Q7 maintains an OFF state, wherein since the conveyor portions $2_{1a}$, 21b, $2_2$ through $2_{11}$ of either of the local zone or the selected zone is not FULL with loads O, no FULL is indicated.

Further, since a signal flows into only a part of the signal input lines $12_1$ through $12_7$, a signal is inputted from a part of the downstream FULL CANCEL input portion 41 and local load input portion 26, and the OR circuit 44 outputs a signal, whereby the operational amplifier 55 outputs a LOW level signal, and no base current is supplied into the base of the transistor Q7 to cause the transistor Q7 to be turned off. Therefore, since a load O exists in the conveyor portions $2_{1a}$, $2_{1b}$, $2_2$ through $2_{11}$ of either of the selected zone or the local zone, no FULL CANCEL is indicated.

A description is given below of forced removal of a load O on the conveyor portions $2_{1a}$, $2_{1b}$, $2_2$ through $2_{11}$.

First, the switch SW4 of the conveyor portions $2_{1a}$, $2_{1b}$, $2_2$ through $2_{11}$ at which forced removal is carried out is closed in advance. This turns on the light emitting diode LED2 indicating forced removal.

In this state, a base current flows into the transistor Q8 thereby turning on the transistor Q8. Voltage is applied from the collector of the transistor Q8 to the non-reversal input terminal of the operational amplifier 51 via a diode D16. Operational amplifier 51 outputs a HIGH level signal regardless of the output of the OR circuit 35. This supplies a base current to the transistor Q5 to cause the transistor Q5 to be turned on. The solenoid valves, $7_{1a}$, $7_{1b}$, and $7_2$ through $7_{11}$ are turned on, and the drive roller 5 is brought into contact with the transfer rollers 3 to rotate the transfer rollers 3, whereby the load O is transferrable to enable forced removal. Thereafter, the light emitting diode LED2 is turned off to terminate the forced removal.

According to the above conveyor controlling device, whether or not a load exists in the local zone is inputted into the local load input portion, whether or not a load exists in a plurality of selected downstream zones is inputted into a plurality of downstream load input portions, wherein the controlling means stops drive of the local corresponding zone when a signal indicating that a load exists is inputted from all of the local load input portion and downstream load input portions is inputted, and drives the local corresponding zone when no signal is inputted, which instructs that no load exists in any one of the local load input portion and downstream load input portion, whereby the respective zones of the conveyor can be controlled with a simple construction.

According to the conveyor controller device, the respective zones of the conveyor can be controlled by the OR circuit and operational amplifiers with a simple construction.

According to the conveyor controlling device, whether or not a load exists in the local zone is inputted into the local load input portion, whether or not a load exists in a plurality of downstream zones selected by the downstream load selecting switch is inputted into a plurality of downstream load input portions, wherein the controlling means stops drive of the local corresponding zone when a signal instructing that a load exists is inputted from all of the local load input portion and downstream load input portions selected by the downstream load selecting switch, and drives the local corresponding zone when no signal is inputted, which instructs that no load exists in any one of the local load input portion and downstream load input portions selected by the downstream load selecting switch, whereby the respective zones of the conveyor can be controlled with a simple construction.

According to the conveyor controlling device, the respective zones of the conveyor can be controlled by the OR circuit and operational amplifiers with a simple construction.

According to the conveyor controlling device, if, by inputting FULL from zones corresponding to the downstream FULL input portions, a signal instructing that a load exists is inputted from all of the local load input portions and downstream FULL input portions, a FULL signal is outputted, and the FULL condition can be easily detected.

According to the conveyor controller device, if, by inputting FULL from the zone corresponding to the downstream FULL input portion selected by the downstream FULL selecting switch, a signal, which instructs that a load exists in all of the local load input portion and downstream FULL input portions selected by the downstream FULL selecting switch, is inputted, a FULL signal is outputted, and the FULL condition can be easily detected.

According to the conveyor controlling device, if, by inputting FULL CANCEL from the zone corresponding to the downstream FULL CANCEL input portion, a signal which instructs that no load exist in any one of the local load input portion and downstream FULL input portions is inputted, a FULL CANCEL signal is outputted, and the FULL CANCEL condition can be easily detected.

According to the conveyor controlling device if, by inputting FULL CANCEL from the zone corresponding to the downstream FULL CANCEL input portions selected by the downstream FULL CANCEL selecting switch, a signal instructing that no load exists in any one of the local load input portions and downstream FULL CANCEL input portions selected by the downstream FULL CANCEL selecting switch is inputted, a FULL CANCEL signal is outputted, and the FULL CANCEL condition can be easily detected.

According to the conveyor controlling device, if a signal is inputted into the drive input portion, the device induces the driving of the local zone, whereby induced removal can be carried out by inputting a signal in the drive input portion.

According to the conveyor controlling device, if a signal is inputted into the drive input portion in a state where a signal is inputted from the drive input portion by the drive selecting switch, the device induces the driving of the local zone, and forced removal can be carried out by inputting a signal into the drive input portion.

According to the conveyor controlling device, a plurality of conveyor controlling devices are provided, disposed corresponding to the zones consisting of at least a part of the conveyor, which are divided into a plurality along the transferring direction and can be independently driven. Therefore, respective effects can be brought about.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A conveyor controlling device for controlling respective zones which are divided along the transferring direction of a conveyor, said zones can be independently driven, said conveyor disposed in said respective zones, comprising:

at least one local load inputting portion in each local zone;

said local load inputting portion including means for indicating whether or not a load to be transferred exists in said local zone;

a plurality of downstream load inputting portions corresponding to selected downstream zones;

each of said downstream load inputting portions including means for indicating whether or not a load to be transferred exists in its corresponding zone;

means for controlling drive in a local zone;

said means for controlling containing means for stopping drive of a corresponding local zone when a signal is received indicating that a load to be transferred exists in said local load inputting portion all of downstream load inputting portions;

said means for controlling further including means for driving said corresponding local zone in the absence of a signal indicating that all downstream zones are occupied; and said means for controlling further including means for stopping drive of said corresponding local zone when said corresponding local zone does not contain a load to be transferred.

2. A conveyor controlling device as set forth in claim 1, wherein:

means for controlling includes an OR circuit;

said OR circuit being connected to generate an output when an output is issued from the local load inputting portion and any one of the downstream load inputting portions;

an operational amplifier receiving an output of said OR circuit; and said operational amplifier effective to drive its local zone when an output is received from said OR circuit.

3. A conveyor controlling device which is disposed in respective zones which are divided along the transferring direction of a conveyor, said respective zones being independently driven, comprising:

local load inputting portions corresponding to each local zone;

said local load inputting portions determining whether or not a load to be transferred exists in its local zone;

a plurality of downstream load inputting portions corresponding to selected downstream zones in sequence;

said downstream load inputting portions determining whether or not a load to be transferred exists in corresponding zones;

a downstream load selecting switch for turning on and off input of a signal from said downstream load inputting portions; and means for controlling effective to stop a drive of a corresponding local zone when a signal is received indicating that there exists a load to be transferred in said local load inputting portion and all of said downstream load inputting portions selected by said downstream load selecting switch, and so as to drive the corresponding local zone when a signal is inputted, which instructs that there is no load to be transferred, in any of the local load inputting portions and downstream load inputting portions which are selected by said downstream load selecting switch.

4. A conveyor controlling device as set forth in claim 1, wherein said means for controlling includes an OR circuit which generates an output when an output is issued from the local load inputting portion and any one of the downstream load inputting portions selected by said downstream load selecting switch, and an operational amplifier which enables drive in a local zone when an output is issued from said OR circuit.

5. A conveyor controlling device as set forth claim 1, further comprising:
   a plurality of downstream FULL inputting portions in downstream zones and input FULL from the corresponding zones;
   said means for controlling includes means for outputting a FULL signal when a signal indicating that there is a load in the local load inputting portion and all of downstream FULL inputting portions.

6. A conveyor controlling device as set forth in claim 1, further comprising:
   a plurality of downstream FULL inputting portions corresponding to the respective downstream zones;
   said downstream FULL inputting portions including means for indicating that their respective zones are FULL; and
   a downstream FULL selecting switch for turning on and off input of a signal from the downstream FULL inputting portions;
   said means for controlling including means for producing a FULL signal when a signal indicating the presence of a load in the local load inputting portions and all of the downstream FULL inputting portions selected by said downstream FULL selecting switch.

7. A conveyor controlling device as set forth in claim 1, further comprising:
   a plurality of downstream FULL CANCEL inputting portions in downstream zones;
   said downstream FULL CANCEL inputting portions including means for generating inputs from zones corresponding thereto that the zones are not full;
   said means for controlling producing a FULL CANCEL signal when a signal is inputted, which indicates that no load exists in the local load inputting portions and in the downstream FULL CANCEL inputting portions.

8. A conveyor controlling device as set forth in claim 1, further comprising:
   a plurality of downstream FULL CANCEL inputting portion corresponding to respective downstream zones one after another;
   said downstream FULL CANCEL inputting portion including means for indicating that the respective zones are not FULL;
   a downstream FULL CANCEL selecting switch for turning on and off an input of a signal from said downstream FULL CANCEL inputting portion;
   said means for controlling includes means for outputting a FULL CANCEL signal when a signal is inputted, which indicates that there is no load in either the local load inputting portion or the downstream FULL CANCEL inputting portion selected by the downstream FULL CANCEL selecting switch.

9. A conveyor controlling device as set forth in claim 1, further comprising a drive input portion which inputs a signal forcedly driving a local zone, wherein said means for controlling forcedly drives the local zone when a signal is inputted in said drive input portion.

10. A conveyor controlling device as set forth in claim 1, further comprising:
    a drive input portion;
    said drive input portion includes means for inputting a signal forcedly driving a local zone;
    a drive selecting switch for turning on or off an input of a signal from said drive input portion;
    said means for controlling including means for forcedly driving the local zone when a signal is inputted in said drive input portion when the drive selecting switch is turned on.

11. A conveyor apparatus, comprising:
    zones consisting of at least a part of a conveyor, which are divided into a plurality along the transferring direction of said conveyor;
    means for independently driving said zones;
    conveyor controlling devices which are disposed corresponding to these respective zones;
    said conveyor controlling devices, comprising:
      a local load inputting portion in each local zone;
      said local load inputting portion including means for indicating whether or not a load to be transferred exists in said local zone;
      a plurality of downstream load inputting portions corresponding to selected downstream zones;
      each of said downstream load inputting portions including means for indicating whether or not a load to be transferred exists in its corresponding zone;
      means for controlling drive in a local zone;
      said means for controlling containing means for stopping drive of a corresponding local zone when a signal is received indicating that a load to be transferred exists in said local load inputting portion all of downstream load inputting portions;
      said means for controlling further including means for driving said corresponding local zone in the absence of a signal indicating that all downstream zones are occupied; and
      said means for controlling further including means for stopping drive of said corresponding local zone when said corresponding local zone does not contain a load to be transferred.

12. A conveyor apparatus comprising:
    an upstream zone;
    said upstream zone including a first controllable drive mechanism;
    at least one downstream zone, downstream of said upstream zone in a direction of conveyance;
    said at least one downstream zone including a second controllable drive mechanism;
    means for enabling operation of said first controllable drive mechanism to convey a load only when said downstream zone does not contain a load;
    means for disabling operation of said first controllable drive mechanism when all of said at least one downstream zone contains a load;
    each said controllable drive mechanism, comprising;
      at least one local load inputting portion in each respective local zone;
      said local load inputting portion including means for indicating whether or not a load to be transferred exists in said local zone;
      a plurality of downstream load inputting portions corresponding to selected downstream zones;

each of said downstream load inputting portions including means for indicating whether or not a load to be transferred exists in its corresponding zone;

means for controlling drive in a local zone;

said means for controlling containing means for stopping drive of a corresponding local zone when a signal is received indicating that a load to be transferred exists in said local load inputting portion all of downstream load inputting portions;

said means for controlling further including means for driving said corresponding local zone in the absence of a signal indicating that all downstream zones are occupied; and said means for controlling further including means for stopping drive of said corresponding local zone when said corresponding local zone does not contain a load to be transferred.

13. Apparatus according to claim 12, wherein:

said at least one downstream zone includes at least first and second downstream zones in a sequence in said direction of conveyance;

said first downstream zone including said second controllable means;

said second downstream zone containing a third controllable means;

said means for disabling includes means for disabling said second controllable means when a load exists in said second downstream zone; and said means for disabling includes means for disabling said first controllable means when a load exists in both said first and second downstream zones.

* * * * *